United States Patent Office 3,165,495
Patented Jan. 12, 1965

3,165,495
HYDROQUINONE SUBSTITUTED POLYMERS
Lloyd D. Taylor, Everett, Mass., assignor to Polaroid Corporation, Cambridge, Mass., a corporation of Delaware
No Drawing. Filed Apr. 3, 1961, Ser. No. 100,019
5 Claims. (Cl. 260—47)

The present invention is concerned with a novel process for preparing polymers.

One object of this invention is the novel synthesis of polymers containing a hydroquinone substituent.

Other objects of the invention will in part be obvious and will in part appear hereinafter.

The invention accordingly comprises the several steps and the relation and order of each of one or more of such steps with respect to each of the others, and the scope of the application of which will be indicated in the claims.

For a fuller understanding of the nature and objects of the invention, reference should be had to the following detailed description.

Polymers containing hydroquinone substitutents have been treated extensively in the literature. However, this type of polymer is difficult and tedious to prepare. For example, the preparation of polyvinyl gentisal, described in U.S. Patent No. 2,710,801, comprises a lengthy process with a number of steps involving several reactants and a 44 hour purification step, whereas the process of the present invention involves the mixing of two compounds, refluxing, e.g., for 24 hours, and a simple purification by precipitation.

This invention is concerned with the novel synthesis of polymers with a hydroquinone structure joined by a chemical bond stable to concentrated alkali. The novel synthesis comprises the reaction of a polymer containing an acylatable nitrogen atom with a lactone of hydroquinone.

The polymers prepared by this invention may be represented by recurring units of the formula:

(A) 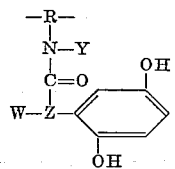

wherein R is an alkylene or aralkylene, for example phenethylene, radical, Y is a hydrogen, alkyl, or aryl radical, Z is an alkylene group comprising 1 or 2 carbon atoms, and W is a lower alkyl group or hydrogen atom.

When the nitrogen atom of the amino group is an intralinear atom of the backbone of the polymeric chain, the polymers prepared by this invention may be represented by recurring units of the formula:

(B) 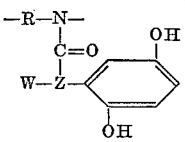

wherein R, Z and W have the same meaning as above.

In defining R as an alkylene or aralkylene radical it should be understood that this definition may include one or more substituents such as halogen, alkyl, aryl, alkoxy, hydroxyl, carboxyl, and sulfonyl groups.

It should also be understood that the hydroquinone radical may also be substituted in the 3, 4 or 6 positions, by, for example, an alkyl group.

The novel synthesis of this invention is carried out by the reaction of a polymer containing an acylatable nitrogen atom with a compound of the formula:

(C) 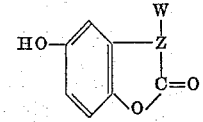

wherein Z is an alkylene group comprising 1 or 2 carbon atoms and W is hydrogen or a lower alkyl group.

Polymers within Formula A may be prepared by using an amine such as polyvinylamine. Polymers within Formula B, where the nitrogen atom is an intralinear atom of the backbone of the polymeric chain, may be prepared by using polyethyleneimine. As other examples of suitable amines mention may be made of polybutyl-aminoethylmethacrylate and polyvinyl 2-aminoethyl ether.

As examples of compounds within Formula C, mention may be made of:

(1) 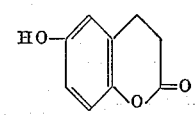

6-hydroxy-3,4-dihydrocoumarin (2) 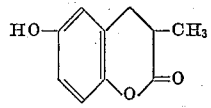

6-hydroxy-3,4-dihydro-3-methyl-coumarin (3) 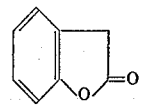

Homogentisic acid lactone

The compound illustrated by Formula 1, 6-hydroxy-3,4-dihydrocoumarin, may be prepared by conventional methods from 2,5-dimethoxybenzaldehyde and malonic acid followed by reduction and simultaneous demethylation and lactonization with hydrobromic acid.

As examples of polymers containing a hydroquinone substituent prepared by the novel synthesis of this invention, mention may be made of:

(4) 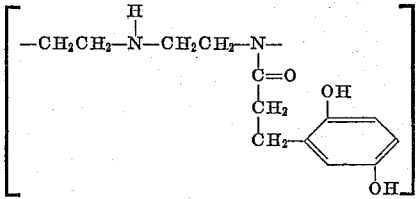

(5) 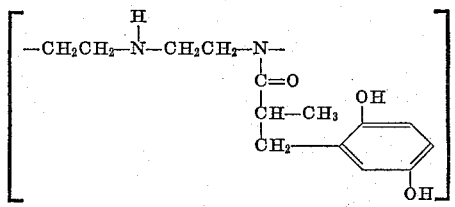

The following non-limiting example illustrates the novel synthesis within the scope of this invention.

*Example*

14 g. of a 50% aqueous solution of polyethyleneimine (50,000 molecular weight) was refluxed for 24 hours with 25 g. of 6-hydroxy-3,4-dihydrocoumarin in 200 cc. of a 50% methanol-water solution. The product was precipitated and reprecipitated into acetone. 8 g. of the polymer were obtained. The polymer is alkali-soluble. The infrared spectrum shows no carbonyl absorption at 1730 cm.$^{-1}$ associated with the lactone but a band at 1640 cm.$^{-1}$ which is characteristic of an amide.

The polymers prepared by this invention are useful as nondiffusing reducing agents to prevent fog or stain in photographic emulsions.

Since certain changes may be made in the above process without departing from the scope of the invention herein involved, it is intended that all matter contained in the above description shall be interpreted as illustrative and not in a limiting sense.

What is claimed is:

1. A process for preparing hydroquinone-substituted polymers represented by recurring groups selected from the group consisting of:

(A)

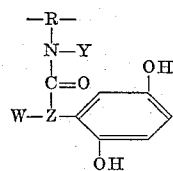

and (B)

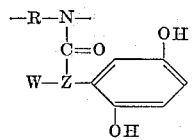

wherein R is selected from the group consisting of alkylene and aralkylene radicals, Y is selected from the group consisting of hydrogen, alkyl and aryl radicals, Z is an alkylene radical comprising one to two carbon atoms, inclusive, and W is selected from the group consisting of hydrogen and lower alkyl radicals; said process comprising reacting an amine-containing polymer, said amine having an acylatable amino nitrogen atom, with a compound of the formula:

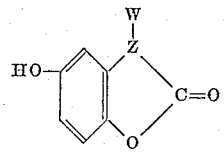

wherein Z and W have the same meaning as above.

2. A process as defined in claim 1 wherein said amine-containing polymer is polyethyleneimine.

3. The process for preparing a polymer having recurring segments of the formula:

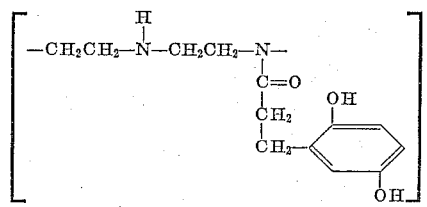

which comprises refluxing polyethyleneimine and 6-hydroxy-3,4-dihydrocoumarin in a methanol-water solution.

4. A process for preparing hydroquinone-substituted polymers represented by recurring groups selected from the group consisting of:

(A)

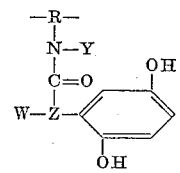

and (B)

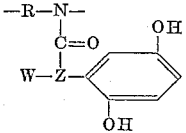

wherein R is selected from the group consisting of alkylene and aralkylene radicals, Y is selected from the group consisting of hydrogen, alkyl and arly radicals, Z is an alkylene radical comprising one to two carbon atoms, inclusive, and W is selected from the group consisting of hydrogen and lower alkyl radicals; said process comprising reacting an amine-containing polymer, the nitrogen of said amine having at least one hydrogen atom, with a compound of the formula:

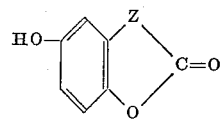

wherein Z and W have the same meaning as above.

5. A process as defined in claim 4 wherein said amine-containing polymer is polyethyleneimine.

References Cited in the file of this patent
FOREIGN PATENTS
8,842    Japan _____ Oct. 1, 1959